April 1, 1947.  E. G. CARLSON  2,418,395
CONTROL APPARATUS FOR FORCED DRAINAGE
Filed Sept. 23, 1944
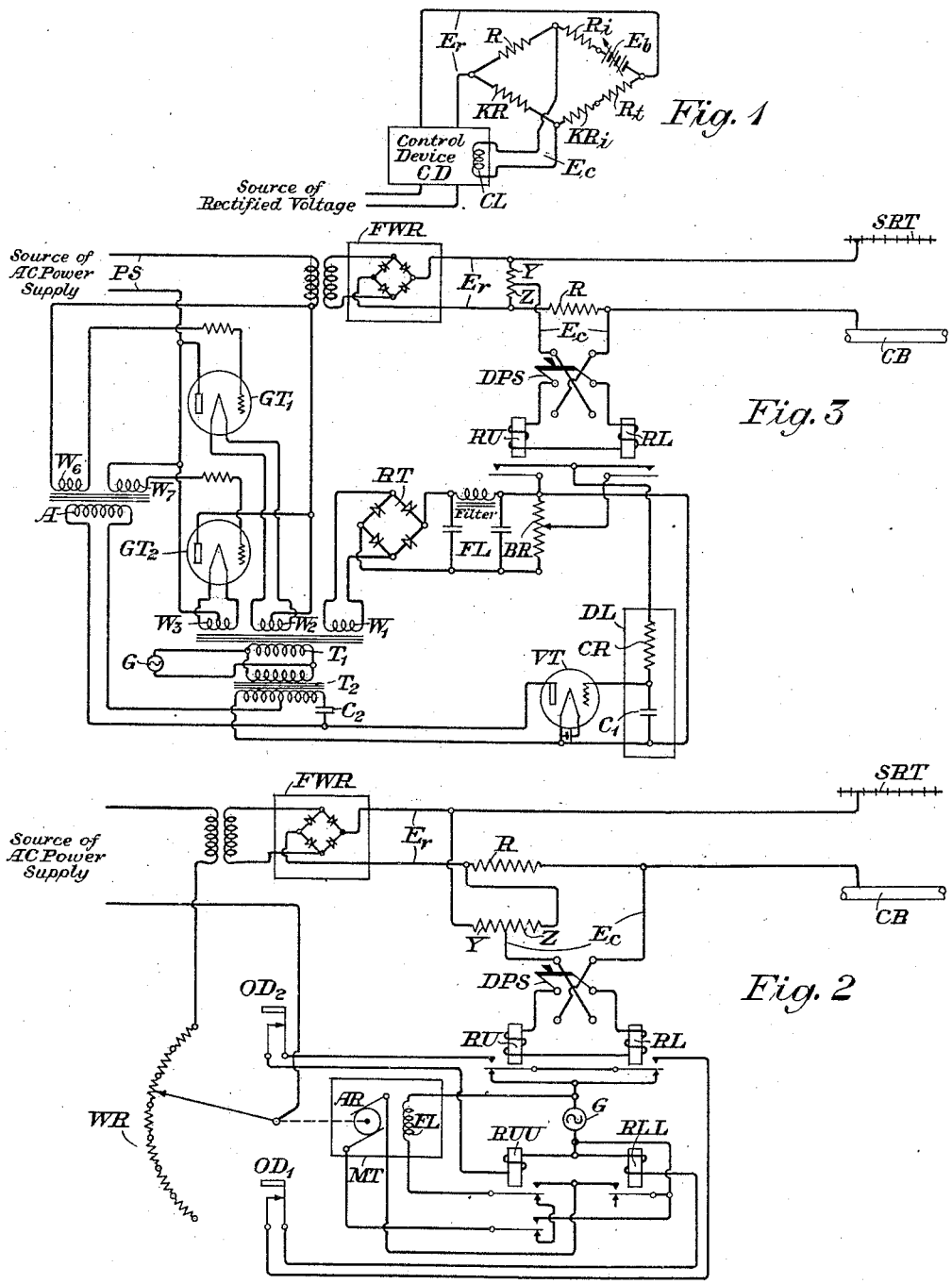
INVENTOR
E. G. Carlson
BY Jefferson Ehrlich
ATTORNEY Patented Apr. 1, 1947

2,418,395

UNITED STATES PATENT OFFICE 2,418,395

CONTROL APPARATUS FOR FORCED DRAINAGE

Eric Gustav Carlson, Philadelphia, Pa., assignor to American Telephone and Telegraph Company, a corporation of New York Application September 23, 1944, Serial No. 555,547

8 Claims. (Cl. 171—316)

This invention relates to forced drainage systems and to apparatus or arrangements for reducing or preventing the corrosion of the sheaths of cables which may be exposed to stray currents from electrical circuits employed for power or other services.

It is well known that when an underground telephone cable is exposed to a grounded D. C. power system some of the current of the power system will flow through the ground to the cable sheath. If the resulting voltage on the cable sheath is positive with respect to the earth (anodic condition), the cable sheath may undergo electrolysis at one or more points and may in due course become corroded. This constitutes a menace to the continuity of service over the numerous telephone conductors contained within the cable sheath.

It has heretofore been the practice to connect the cable sheath to a suitable point on the power system by means of a heavy copper wire or other good conductive medium so that the current on the cable sheath will flow from the cable sheath back to the power system over the copper wire or other conductor rather than through the earth, thereby to reduce the corrosive effect upon the cable sheath. If the distance of the cable from a suitable point of connection to the power system is quite large, the amount of wire required for the drainage system may be prohibitive and, aside from the cost of the copper wire, the expense of installation may be considerable. Such a drainage system is not always the most feasible nor economically the most advantageous solution.

In some cases, in order to reduce over-all costs, it has been the practice to use a drainage wire of smaller size than would ordinarily be required and to compensate for the excess resistance by inserting in series therewith a device for supplying an electromotive force. This arrangement has the inherent disadvantage that the drainage current does not vary in direct relationship with the need for protection but contains a constant component of current which is a function of the circuit resistance and the E. M. F. of the device employed. This results in a waste of electrical power and in some cases may react unfavorably on other underground structures not so protected.

It is therefore proposed to incorporate in a drainage system a device which is capable of supplying an E. M. F. together with an arrangement for controlling the drainage current in accordance with actual protection requirements.

The drainage apparatus of this invention will be shown by way of illustration as interconnecting a cable sheath and street railway trackage to which the cable sheath is exposed, the drainage apparatus including a rectifier, a bridge network and regulating apparatus for controlling the voltage obtained from the rectifier. The bridge network produces a voltage in one of its diagonals which is proportional to any change in the open circuit voltage between the cable sheath and the trackage, the voltage produced in said diagonal of the bridge network then acting to operate the regulating apparatus to correspondingly vary the voltage obtained from the rectifier. By changing the voltage obtained from the rectifier, it is possible to modify the current traversing the bridge network until the voltage in said diagonal returns to its former value. The value of voltage in said diagonal of the bridge network will be practically zero if the bridge network is properly adjusted initially.

This invention will be better understood from the following description when read in connection with the accompanying drawing in which Figure 1 illustrates the bridge network and control device of this invention, Fig. 2 shows a motor control system as part of the invention, and Fig. 3 shows an electronic control system as part of the invention.

Referring to Fig. 1 of the drawing, there is shown a bridge network in which resistor R is one of the arms of the network and physically may be the resistance of the wire between the rectifier and the cable, or some other low resistance, resistor KR another arm of the network, resistor $R_1$ and the source of voltage $E_b$ together comprise the third arm of the network, and resistors $KR_1$ and $R_t$ together comprise the fourth arm of the network. Resistors KR and $KR_1$ have magnitudes which may be many times as large as resistors R and $R_1$, respectively, K being the factor of magnification. This factor K may be, for example, 100. A source of rectified voltage of controllable magnitude is designated $E_r$ and is connected to one diagonal of the bridge network. The voltage employed to control the magnitude of the rectified voltage $E_r$ is obtained from the other diagonal $E_c$ of the bridge network.

In this bridge network the source $E_b$ represents the open circuit voltage between a particular installation of telephone cable and street railway trackage at the point where the rectified voltage will be supplied for drainage purposes. Resistor $R_1$ represents the inherent resistance between the cable and the trackage. The magnitude of resistor $R_i$ may be determined by bridging a conductor of finite resistance between the cable and the trackage, the resistor $R_i$ being the quotient of the resultant change in voltage between the cable and trackage and the current flowing in the bridging conductor of finite resistance. The resistor $R_t$ will be of a magnitude which may be determined from the values of the elements already mentioned, as follows:

$$R_t = \frac{K(R+R_i)}{\frac{E_r}{E_b}-1}$$

It will be observed that if the voltage $E_b$ and resistor $R_t$ were omitted, the bridge network would be balanced and there would be no voltage across the diagonal $E_c$. The insertion of resistor $R_t$ unbalances the bridge network unless the voltage $E_b$ is of a value equal to the voltage drop across resistor $R_t$ divided by the factor $K$. The bridge network is arranged so that it will be balanced when the voltage $E_b$ is substantially equal to a predetermined value relative to the voltage $E_r$. At this predetermined value of $E_b$, there will be practically no voltage across the diagonal $E_c$. Consequently the control device CD, which is under the influence of the bridge diagonal $E_c$, will exercise no control over the rectified voltage supplied to the other bridge diagonal $E_r$. The ratio $$\frac{E_r}{E_b}$$

will then remain unchanged.

If the voltage $E_b$, that is, the voltage between cable and trackage, increases in magnitude due, for example, to the approach of a trolley, the bridge network will become unbalanced. In that case a voltage in one direction will appear across the diagonal $E_c$, driving current therethrough in the same direction. This current will traverse the coil CL of the control device CD and the control device will then reduce the impedance introduced between the source of rectified power and the bridge diagonal $E_r$. The rectified voltage applied to the diagonal $E_r$ will therefore increase and continue to increase until the bridge network again becomes balanced. When the bridge network balance is restored, the voltage across diagonal $E_c$ will be reduced to a nullity and the control device CD will apply no further change to the rectified voltage across the diagonal $E_r$.

If the voltage $E_b$ should decrease from its value when the bridge is balanced, a voltage in the opposite direction will appear across the diagonal $E_c$. This voltage will cause current to flow through coil CL of the control device CD in a direction opposite to that heretofore considered. The control device will then increase the impedance inserted between the source of rectified power and the bridge diagonal $E_r$. The rectified voltage applied to diagonal $E_r$ will therefore decrease and this voltage will continue to decrease until the bridge network is again restored to balance. When this happens there will be no further change in the rectified voltage across diagonal $E_r$. The bridge network will be found balanced whenever the ratio $$\frac{E_r}{E_b}$$

returns to its assigned value. The control device CD is employed to couple the voltage $E_b$ to the source of rectified voltage so that the applied rectified voltage $E_r$ will be changed in magnitude to correspond to changes in the voltage $E_b$ so as to maintain the ratio $$\frac{E_r}{E_b}$$

constant. Certain forms of the control device CD will be described hereinafter.

Fig. 2 shows the control apparatus of this invention connected between the cable CB and the street railway trackage SRT. Here the full wave rectifier FWR supplies a rectified voltage $E_r$ to a circuit which includes resistor R, cable CB and trackage SRT. The rectified voltage $E_r$ is also supplied to a parallel circuit which includes resistors Y and Z. Resistor Z corresponds to resistor KR of Fig. 1 and resistor Y is the additive combination of resistors $KR_i$ and $R_t$ of Fig. 1. The open circuit voltage $E_b$ between the cable and trackage and the inherent resistance $R_i$ therebetween are not separately shown in Fig. 2, although they form one of the arms of the bridge network described in connection with Fig. 1. The diagonal $E_c$ of the bridge network is connected between the right hand terminal of resistor R and the terminal common to resistors Y and Z. With this explanation the similarity between the bridge networks of Figs. 1 and 2 will become obvious.

The diagonal $E_c$ of the bridge network is connected by a double-pole, double-throw reversing switch DPS to two polar relays RU and RL. Assuming switch DPS to be in its upper position and the bridge network balanced by a suitable voltage $E_b$ between cable CB and trackage SRT, there will be practically no current through the windings of relays RU and RL and these relays will be released. When the voltage $E_b$ between the cable CB and the trackage SRT falls appreciably, there will be current in one direction through the windings of relays RU and RL, but only relay RL will become operated. The operation of relay RL will cause relay RLL to operate, the operating circuit of which includes generator G, the back contact and armature of relay RU, the armature and make contact of relay RL, the overdrive contacts $OD_1$ and the winding of relay RLL. The operation of relay RLL will cause the motor MT to rotate in a direction so as to increase the amount of resistance inserted by rheostat WR in the input circuit of rectifier FWR. The motor circuit includes generator G, the motor field winding FL, the inner armature and back contact of relay RUU, the back contact and outer armature of relay RUU, the armature AR of the motor MT and the make contact and armature of relay RLL. The increase in the amount of resistance inserted by rheostat WR will reduce the current supplied by the source of power PS to the input circuit of rectifier FWR, and thereby reduce the voltage $E_r$ applied to one of the bridge diagonals.

The motor MT will continue to operate to continually increase the resistance added by rheostat WR to the input circuit of rectifier FWR until the voltage appearing in the other bridge diagonal $E_c$ is reduced practically to zero. When the current in diagonal $E_c$ becomes sufficiently reduced, relay RL will release and this in turn will cause relay RLL to release and hence the motor MT will stop.

If the voltage $E_b$ between the cable CB and the trackage SRT increases so as to unbalance the bridge network, current will then flow through the windings of relays RU and RL in the opposite direction. Consequently relay RU will operate.

This in turn will cause relay RUU to operate over a circuit including generator G, the back contact and armature of relay RL, the armature and make contact of relay RU, the overdrive contacts OD$_2$, and the winding of relay RUU. The operation of relay RUU will cause the motor MT to rotate in the opposite direction so as to decrease the amount of resistance inserted by rheostat WR into the input circuit of rectifier FWR. The circuit for driving the motor MT in the opposite direction includes generator G, the field winding FL of motor MT, the inner armature and make contact of relay RUU, the armature AR of motor MT and the outer armature and make contact of relay RUU. By so decreasing the resistance in the input circuit of rectifier FWR, the rectified voltage E$_r$ will be continually reduced until the bridge network becomes balanced. When the bridge network is balanced, relay RU will release, thereby releasing relay RUU and stopping the motor MT. The overdrive contacts OD$_1$ and OD$_2$ are employed to break the circuits of relays RLL and RUU, respectively, to stop the motor MT when the arm of rheostat WR has been driven too far in a counterclockwise or clockwise direction. These added contacts will protect the equipment in the event of unusual power conditions.

The double-pole switch DPS will be thrown to its upper position for an installation in which the cable CB is at a negative potential with respect to the trackage SRT. In that case the rectified voltage E$_r$ will oppose the voltage existing between the cable CB and the trackage. In any installation in which the cable is at a positive potential with respect to the trackage, the switch DPS will be thrown to its lower position so that the rectified voltage E$_r$ will aid the voltage between the cable and the trackage.

Fig. 3 differs from Fig. 2 primarily in that the motor circuit of Fig. 2 is replaced by an electronic circuit. The generator G supplies current to a transformer T$_1$, one of the secondary windings of which is designated W$_1$ and is connected through a full-wave rectifier RT and a low-pass filter FL to a resistor BR. Part of the rectified voltage received by resistor BR will be used to bias the grid circuit of the vacuum tube VT. The secondary windings W$_2$ and W$_3$ are connected across the cathodes of tubes GT$_1$ and GT$_2$, respectively. The generator G also supplies voltage through transformer T$_2$ to the anode circuit of tube VT. The secondary winding of transformer T$_2$ is connected to the primary winding of transformer A as shown. The secondary windings W$_6$ and W$_7$ of transformer A are connected to the grid circuits of tubes GT$_1$ and GT$_2$ as shown to control the firing time of these tubes. The tubes GT$_1$ and GT$_2$ may be of the thyratron type and exercise a control over the amount of power supplied by source PS to rectifier FWR. This will be described in greater detail hereinafter.

When the ratio of voltage $$\frac{E_r}{E_b}$$

is at its normal value, the bridge network will be balanced, as already pointed out hereinabove, and relays RU and RL will be unoperated. However, if the voltage E$_b$ between the cable CB and the trackage should decrease sufficiently so as to unbalance the bridge network, relay RL will operate. This will cause condenser C$_1$ of a delay circuit DL to become charged so as to bias the grid of tube VT to a negative potential with respect to its cathode. The charging circuit includes the upper portion of the bias resistor BR, the armature and make contact of relay RL, resistor CR and condenser C$_1$. The resistor CR controls the rate at which condenser C$_1$ becomes charged. The effect of the rising negative voltage on condenser C is to progressively increase the impedance of tube VT. Consequently a progressively smaller alternating current originating in generator G will traverse the primary winding of transformer T$_2$ over a circuit which includes the anode of tube VT, condenser C$_2$, the secondary winding of transformer T$_2$, and the cathode of tube VT. Since the primary winding of transformer A is connected across the right half of the secondary winding of transformer T$_2$ through condenser C$_2$, a voltage of progressively changing phase will be applied through the transformer A to the windings W$_6$ and W$_7$ of transformer A. During the positive half of the cycle, the transformer winding W$_6$ will retard the phase of the voltage applied to the grid of tube GT$_1$ with respect to the anode voltage of this tube obtained from source PS. During the negative half of the cycle the transformer winding W$_7$ will retard the phase of the voltage applied to the grid of tube GT$_2$ with respect to its anode voltage. The difference in the phases between the grid and plate voltages of tubes GT$_1$ and GT$_2$ will progressively increase and thereby correspondingly retard the firing points of these tubes. Hence, during the positive half of the cycle of source PS, a smaller current will flow from this source PS to rectifier FWR over the anode-cathode path of tube GT$_1$, through winding W$_2$ to rectifier FWR. Likewise, during the negative half of the cycle of voltage of source PS, a smaller current will flow from source PS through rectifier FWR over the anode-cathode path of tube GT$_2$ and through the winding W$_3$ to the rectifier FWR. The smaller input current will progressively decrease the rectifier voltage E$_r$ until a balanced condition is restored to the bridge network.

When the bridge network becomes balanced, relay RL will release, but the negative charge on condenser C$_1$ will remain substantially unchanged due to the high impedance of the grid-filament path of tube VT. Consequently the bridge network will remain balanced until it is again disturbed by any subsequent change in the voltage E$_b$ between the cable and trackage.

If the voltage E$_b$ should increase so as to disturb the balance of the bridge network, relay RU will operate. This will cause condenser C$_1$ to discharge. The discharge circuit for condenser C$_1$ includes resistor CR and the make contact and armature of relay RU. The discharge of condenser C$_1$ will remove the biasing voltage previously applied by this condenser to the grid of tube VT. The effect of the removal of this biasing voltage is to reduce the impedance of the tube VT and therefore a larger current will flow from generator G through the anode circuit of tube VT to the primary winding of transformer A. The phases of the grid voltages applied by windings W$_2$ and W$_3$ of transformer A to the grids of tubes GT$_1$ and GT$_2$ will be reduced with respect to the phase of the anode voltages applied to these tubes by source PS. A larger current will now flow from source PS to rectifier FWR and cause the rectified voltage E$_r$ to increase until the bridge network becomes balanced. When so balanced, relay RU will release. The rectified voltage E$_r$ will then remain substantially the same thereafter until relays RU or RL again operate.

Although a rectifier system has been shown connected to the bridge network for furnishing a controllable D. C. voltage Er for balancing the bridge network, any other source of controllable D. C. voltage, such as a battery, a D. C. motor, etc. may be substituted therefore, provided its voltage regulating mechanism is included therewith.

The apparatus of the invention has been shown and described for the protection of a cable system against voltages emanating from a power system to which it may be exposed. Clearly, the invention is equally applicable for the protection of other structures, whether above ground or below ground, such as piping, etc.

While this invention has been shown and described in certain particular embodiments merely for illustrative purposes, the general principles of this invention may be applied to other and widely varied organizations without departing from the spirit of the invention and the scope of the appended claims.

What is claimed is:

1. A bridge system comprising four arms having resistors therein, a source of uncontrollable voltage included in one of said arms, a source of controllable voltage connected to a diagonal of said bridge, and means responsive to changes in said uncontrollable voltage to change said controllable voltage until said bridge becomes balanced.

2. The combination of a source of varying voltage, a bridge system having said varying voltage in one of its arms, a source of controllable D. C. voltage connected to a diagonal of said bridge system, means responsive to changes in said varying voltage to change said rectified voltage until said bridge becomes balanced.

3. The combination of a source of varying voltage, a source of rectified voltage which bears a predetermined ratio to said varying voltage, and means to maintain said ratio substantially unchanged, said means including a bridge system having said source of varying voltage in one of its arms and said source of rectified voltage as one of its diagonals, and means controlled by changes in said varying voltage to change said rectified voltage until said bridge system becomes balanced.

4. A bridge system comprising four arms, one of which includes a source of varying voltage, a source of D. C. voltage connected to a diagonal of said bridge, said bridge being balanced when the D. C. voltage and the varying voltage are in a predetermined ratio, and means responsive to a change in said varying voltage to change said D. C. voltage until said predetermined ratio is obtained.

5. A forced drainage system for a cable exposed to a grounded D. C. power circuit, comprising a bridge system having four arms one of which includes said cable and said power circuit, a source of D. C. voltage connected to a diagonal of said bridge system, and means responsive to changes in the voltage between said cable and said power circuit to change the D. C. voltage of said source until said bridge becomes balanced.

6. A forced drainage system for a cable exposed to a grounded D. C. power circuit, comprising a bridge system having said cable and said power circuit as one of its arms, a source of rectified voltage connected to a diagonal of said bridge system, said bridge system being balanced when the rectified voltage and the voltage between said cable and power circuit are in a predetermined ratio, and means responsive to a change in said voltage between the cable and the power circuit to change said rectified voltage until said predetermined ratio is obtained.

7. A forced drainage system for a cable exposed to a grounded D. C. power circuit, comprising a bridge system having said cable and power circuit in one of its arms, a source of A. C. power, a rectifier connected to said source and supplying rectified voltage to a diagonal of said bridge system, and means responsive to changes in the voltage between said cable and said power circuit to change the amount of power supplied by said source to said rectifier.

8. A forced drainage system for a cable exposed to stray currents from a grounded D. C. power circuit, comprising a bridge system having said cable and said power circuit in one of its arms, a source of A. C. power, a rectifier connected to said source and supplying rectified voltage to a diagonal of said bridge system, said rectified voltage bearing a predetermined ratio to the voltage between said cable and said power circuit, and means controlled by changes in said voltage between said cable and said power circuit to change the amount of said A. C. power supplied to said rectifier to maintain said ratio substantially constant.

ERIC GUSTAV CARLSON.

REFERENCES CITED

The following references are of record in the file of this patent:

UNITED STATES PATENTS

| Number | Name | Date |
| --- | --- | --- |
| 2,325,232 | Davis | July 27, 1943 |
| 1,904,569 | Tebo | Apr. 18, 1933 |